(12) United States Patent
Mann et al.

(10) Patent No.: US 10,371,302 B2
(45) Date of Patent: Aug. 6, 2019

(54) HEATABLE FLUID LINE

(71) Applicant: NORMA GERMANY GMBH, Maintal (DE)

(72) Inventors: Stephan Mann, Biebergemuend (DE); Dragan Grcic, Kanjiza (RS)

(73) Assignee: NORMA GERMANY GMBH, Maintal (DE)

( * ) Notice: Subject to any disclaimer, the term of this patent is extended or adjusted under 35 U.S.C. 154(b) by 0 days.

(21) Appl. No.: 15/319,663

(22) PCT Filed: Jun. 16, 2015

(86) PCT No.: PCT/EP2015/063465
§ 371 (c)(1),
(2) Date: Dec. 16, 2016

(87) PCT Pub. No.: WO2015/193305
PCT Pub. Date: Dec. 23, 2015

(65) Prior Publication Data
US 2017/0130886 A1 May 11, 2017

(30) Foreign Application Priority Data
Jun. 17, 2014 (DE) .......................... 10 2014 108 499

(51) Int. Cl.
*F16L 53/00* (2018.01)
*F16L 53/30* (2018.01)
(Continued)

(52) U.S. Cl.
CPC ............ *F16L 53/30* (2018.01); *F01N 3/2066* (2013.01); *F16L 53/38* (2018.01); *F16L 55/027* (2013.01);
(Continued)

(58) Field of Classification Search
CPC ...... F16L 53/38; F16L 55/02754; F16L 53/30; F16L 55/027
(Continued)

(56) References Cited

U.S. PATENT DOCUMENTS 1,435,311 A    11/1922   Knight
1,474,528 A  * 11/1923   Hurst ...................... F02N 19/10
                                                      123/142.5 E
(Continued)

FOREIGN PATENT DOCUMENTS

DE    10 2005 047 806      4/2007
DE    10 2008 018 658      10/2009
(Continued)

OTHER PUBLICATIONS

German Office Action conducted in counterpart German Appln. No. 10 2014 108 499.3 (dated Jul. 7, 2017) (w/ machine translation).
(Continued)

*Primary Examiner* — James F Hook
(74) *Attorney, Agent, or Firm* — Greenblum & Bernstein, P.L.C.

(57) ABSTRACT

Disclosed in a heatable fluid line (1) comprising a tube (2) with an interior, and a heating device (3) inside the interior. The aim is to protect an injection arrangement, which is connected to the fluid line (1), at low temperatures. In order to achieve said aim, a volume reducing element (5) is disposed between the tube and the heating device (3).

13 Claims, 1 Drawing Sheet

(51) Int. Cl.
*F16L 53/38* (2018.01)
*F01N 3/20* (2006.01)
*F16L 55/027* (2006.01)

(52) U.S. Cl.
CPC ...... *F01N 2610/02* (2013.01); *F01N 2610/10* (2013.01); *F01N 2610/14* (2013.01)

(58) Field of Classification Search
USPC ................ 138/33, 26, 108, 110, 113, 40
See application file for complete search history.

(56) References Cited

U.S. PATENT DOCUMENTS

| | | | | | |
|---|---|---|---|---|---|
| 2,408,253 | A | * | 9/1946 | Diebold | H02G 7/00 138/110 |
| 2,583,761 | A | * | 1/1952 | Axelson | B05B 7/1613 138/33 |
| 2,599,671 | A | * | 6/1952 | Thompson | F16L 53/008 123/142.5 E |
| 2,750,487 | A | * | 6/1956 | Hynes | H05B 3/42 138/33 |
| 2,793,917 | A | * | 5/1957 | Ward | E21B 17/105 138/108 |
| 3,283,123 | A | * | 11/1966 | Atkinson | F16L 53/007 138/33 |
| 3,924,661 | A | * | 12/1975 | Bornhoffer | B65D 85/16 138/110 |
| 4,401,156 | A | * | 8/1983 | Wojtecki | B23P 15/26 165/172 |
| 4,754,782 | A | * | 7/1988 | Grantham | F16L 39/005 138/109 |
| 4,883,943 | A | * | 11/1989 | Davis | F02M 31/125 392/486 |
| 5,018,260 | A | * | 5/1991 | Ziu | F16L 7/00 138/108 |
| 5,086,836 | A | * | 2/1992 | Barth | C09K 5/08 137/340 |
| 5,497,809 | A | * | 3/1996 | Wolf | F16L 9/18 138/113 |
| 5,503,192 | A | * | 4/1996 | Platusich | B29C 65/3612 138/112 |
| 5,859,953 | A | * | 1/1999 | Nickless | E03B 7/14 138/33 |
| 6,167,883 | B1 | * | 1/2001 | Beran | F16L 53/38 128/203.17 |
| 7,635,008 | B2 | * | 12/2009 | Follett | F24F 13/08 138/108 |
| 7,637,287 | B2 | * | 12/2009 | Reinhard | F16L 35/00 138/108 |
| 7,650,911 | B2 | * | 1/2010 | Follett | F24F 13/08 138/108 |
| 7,919,733 | B2 | * | 4/2011 | Ellis | H05B 3/50 219/544 |
| 8,555,929 | B2 | * | 10/2013 | Ertel | F16L 9/19 138/108 |
| 9,464,747 | B2 | | 10/2016 | Eckardt et al. | |
| 2008/0012293 | A1 | | 1/2008 | Freiberger et al. | |
| 2010/0037971 | A1 | * | 2/2010 | Scherer | F16L 1/11 138/110 |
| 2010/0186844 | A1 | * | 7/2010 | Koskey, Jr. | F16L 53/008 138/33 |
| 2012/0291881 | A1 | | 11/2012 | Eckardt et al. | |
| 2012/0291904 | A1 | | 11/2012 | Eckardt et al. | |
| 2014/0029927 | A1 | * | 1/2014 | Leblanc | F16L 11/127 392/478 |

FOREIGN PATENT DOCUMENTS

| | | |
|---|---|---|
| DE | 10 2011 102 151 | 11/2012 |
| DE | 10 2011 102 244 | 11/2012 |
| DE | 10 2011 053 053 | 2/2013 |
| EP | 1818588 | 8/2007 |
| EP | 2 527 702 | 11/2012 |
| EP | 2 527 703 | 11/2012 |
| FR | 2 478 161 | 9/1981 |
| JP | 50-073048 | 11/1948 |
| JP | 2012-241901 | 12/2012 |
| WO | 2013/083274 | 6/2013 |

OTHER PUBLICATIONS

Japan Office Action conducted in counterpart Japan Appln. No. 2016-570330 (dated Dec. 25, 2017) (w/ English language translation).

Korean Office Action conducted in counterpart Appln. No. 10-2017-7001341 (9 pages).

* cited by examiner

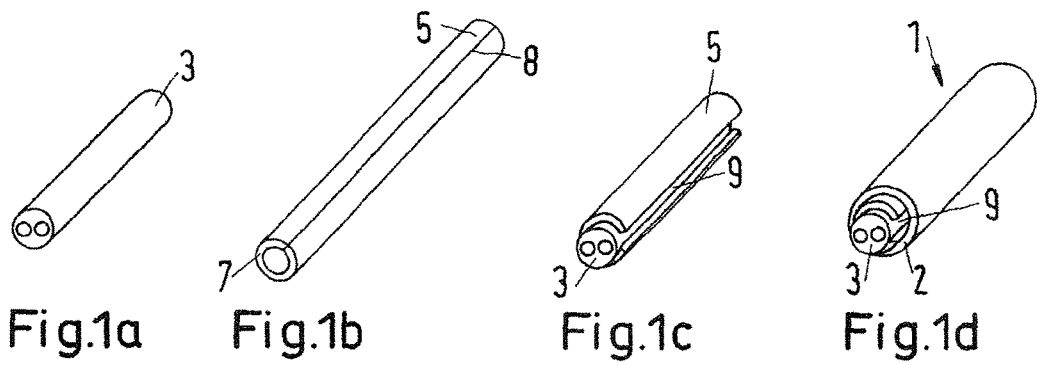
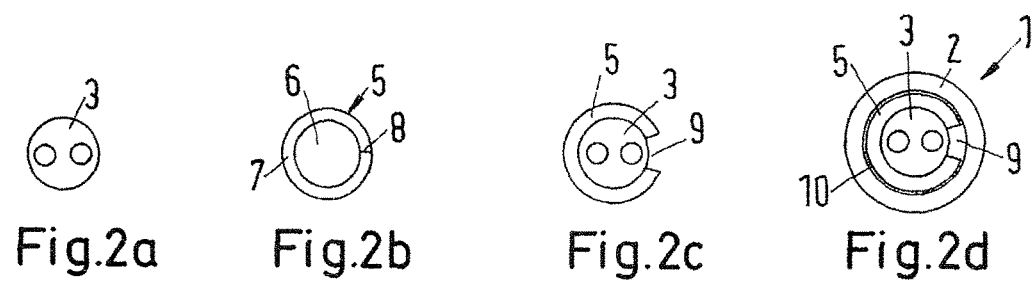
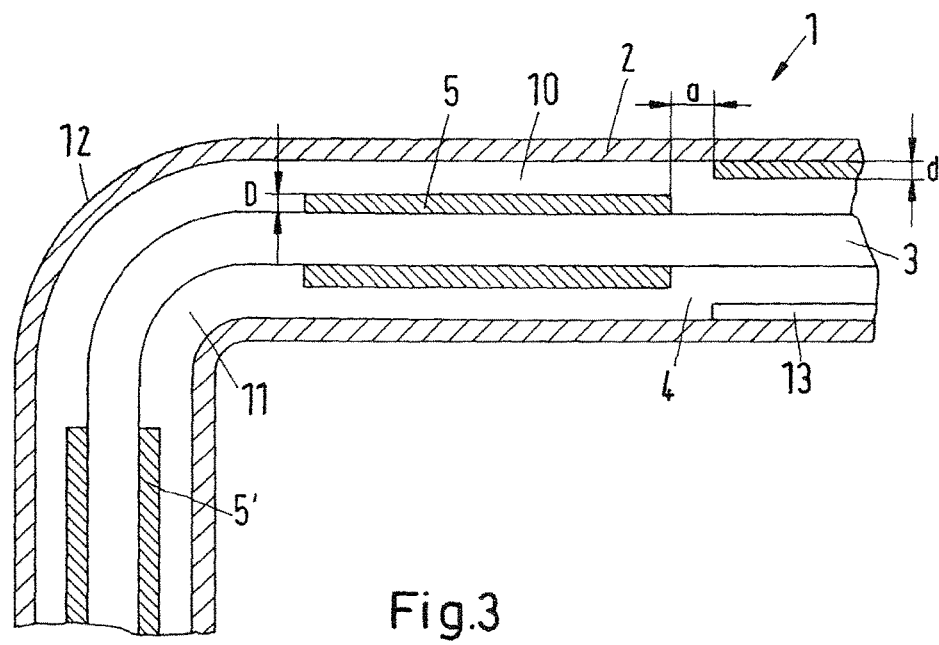

HEATABLE FLUID LINE

The invention relates to a heatable fluid line having a pipe which has an inner space and having a heating device which is arranged in the inner space.

Such a fluid line is known from DE 10 2011 102 244 A1.

The invention is explained below with reference to a fluid line which is used to transport a carbamide solution (UREA) from a storage container to a consumer location. UREA is used in diesel engines in order to reduce the emission of nitrogen oxides.

When such a fluid line is used in an environment in which relatively low temperatures may occur, there is the risk of the carbamide solution freezing so that it is no longer capable of flowing. This situation occurs at temperatures of less than −11°. In order to nonetheless reduce the emission of pollutants within a specific time after an engine has been started, it is known to heat the fluid line so that the carbamide solution is made flowable again and can be supplied to the consumer location.

Another problem is that the carbamide solution can also freeze in an injection region. At this location, there is a nozzle arrangement through which UREA is discharged. If this nozzle arrangement is still filled with the carbamide solution and the carbamide solution freezes, this may lead to damage.

In order to overcome this problem, attempts have been made after the engine has been switched off to draw back the carbamide solution from the fluid line in order to free the nozzles from the carbamide solution. However, a problem arises in this instance in that a relatively large volume is present between the heating device and the pipe. This volume is brought about by the fact that a heating device which is arranged in the inner space of the pipe also has to be guided through a connector which is inserted into the pipe. Accordingly, the heating device may not exceed a specific cross-section. However, the suction of a relatively large quantity of carbamide solution as is determined by the relatively large volume is relatively difficult in many cases.

However, it has been found that, even with such an embodiment, a suction of the carbamide solution when the engine is switched off cannot be achieved with the necessary level of reliability. When UREA is not sufficiently drawn back, UREA remains in the injection arrangement. This can lead to damage at low temperatures.

An object of the invention is to protect the injection arrangement.

This object is achieved with a heatable fluid line of the type mentioned in the introduction in that a volume reduction element is arranged between the pipe and the heating device. When a volume reduction element is arranged in the inner space, that is to say, in the intermediate space between the heating device and the inner side of the pipe, a volume reduction in the annular gap between the pipe and the heating device can be achieved so that less carbamide solution has to be drawn back. This can generally be readily implemented. As a result of the volume reduction element, the nozzle arrangement is protected after the engine has been switched off. In this instance, it is preferable for the volume reduction element to have a recess which extends along the heating device.

As a result of the installation of the volume reduction element, although the volume in the annular gap between the pipe and heating rod has been reduced, a relatively large wetted surface is produced with a correspondingly high level of flow resistance so that the pump when drawing back the carbamide solution occasionally reaches its limits or is overloaded. The recess has a smaller wetted surface and consequently a lower flow resistance so that the pump can draw UREA from the injection arrangement. When a recess is used in the volume reduction element, it is then possible to make the annular gap between the volume reduction element and the pipe even smaller than before so that the volume between the pipe and the heating device does not have to be increased or does not have to be increased significantly. That is to say, therefore, it is possible to leave the suction behavior, in particular the suction volume, of the pump unchanged and nonetheless to achieve an adequate suction and consequently protection of the injection arrangement.

Preferably, the recess extends as far as the heating device. The heating device can then act directly on the fluid in the fluid line without the heating power first having to pass through the volume reduction element. This not only results in excellent use of the thermal energy, but it is also possible to achieve rapid thawing of frozen fluid in the line.

Preferably, the recess has in the peripheral direction of the heating device an extent which corresponds at least to a radial thickness of the volume reduction element. The recess is therefore in principle provided at least with a square or with a rectangular cross-section (if the curvatures are not taken into account) so that there is a sufficient flow cross-section through which the fluid can flow and through which the fluid can also be drawn off.

Preferably, the heating device is constructed as a heating rod and the volume reduction element is clip-fitted onto the heating rod. This enables relatively simple production. A heating rod has a degree of rigidity so that it can be inserted into the pipe and it is possible to ensure that the heating rod extends through the pipe at the desired length. When the volume reduction element is clip-fitted onto the heating rod, it is retained on the heating rod only by friction, but this friction can be sized in such a manner that the volume reduction element on the heating rod is not displaced in the longitudinal direction when the heating rod is inserted into the pipe. The bending resistance of the heating rod with the volume reduction element clip-fitted thereto can be kept smaller than the bending resistance of a heating rod with an extruded volume reduction element. Consequently, the flexibility of the fluid line is on the whole configured in a favorable manner.

Preferably, the volume reduction element is at least partially formed by a hollow member which is separated in the longitudinal direction. It is possible, for example, to use as a hollow member a plastics material pipe which is cut in the longitudinal direction. The cutting line does not necessarily in this instance have to form a straight line, although this is preferable. The cutting or separation line may also extend in a helical or undulating manner without this in principle changing anything concerning the structure of the fluid line. A volume reduction element which is formed by a hollow member can be produced in a very simple manner.

In this instance, it is preferable for the hollow member to have an inner cross-section which is smaller than an outer cross-section of the heating rod. This applies in the hollow member to the state in which the hollow member has not yet been fitted to the heating rod. As a result of the sizing of the inner cross-section of the hollow member, two effects are produced. On the one hand, it is ensured that the hollow member is arranged with a degree of tension on the heating rod when it has been clip-fitted to the heating rod. On the other hand, the desired recess is produced as a result of the sizing since the volume reduction element is slightly splayed when it is clip-fitted onto the heating rod.

Preferably, the volume reduction element is arranged with at least two portions on the heating device. This has, for example, advantages when the heating device has a greater length. In this instance, the volume reduction element can be fitted portion by portion which facilitates the production.

In this instance, it is preferable for the at least two portions to leave an intermediate space free between them. It is not absolutely necessary for the portions to be assembled beside each other in a manner of speaking end-to-end on the heating device. It is readily possible to leave intermediate spaces between the individual portions. In this instance, although a slightly larger volume is produced, this is not detrimental since such a volume is not disruptive either when UREA is drawn from the injection arrangement or when UREA is conveyed to the injection arrangement.

In this instance, it is particularly preferable for the intermediate space to be arranged in a curved portion of the fluid line. In many cases, the fluid line does not extend in a linear manner, but instead has one or more curved portions. The final shape of the fluid line is based on the desired application. In this embodiment, a linear or extended pipe with the heating device and volume reduction element located thereon may first be provided by the heating device being inserted into the pipe in a linear manner. If one or more portions are provided with a curvature afterwards and, at the positions at which the curved portions are provided, a volume reduction element is not provided, the formation of the curvature is then simplified since the volume reduction element does not also have to be bent. Furthermore, this embodiment also enables, for example, at the outer side of the curvature, the pipe to move slightly closer to the heating device without this approach movement being disrupted by the volume reduction element. Under some circumstances, a volume change may be accepted, but may reduce the flow resistance so that the flow resistance for the entire fluid line can be optimized.

Preferably, the fluid line is thermo-fixed with the heating device and the volume reduction element. As a result of the thermo-fixing, the fluid line is maintained in a predetermined shape. During the thermo-fixing operation, a connection between the pipe and the volume reduction element is not required and in many cases is also undesirable. However, as a result of the friction between the volume reduction element and the heating device, the volume reduction element remains in its position. However, slight displacements are harmless.

Preferably, at least at one end of the pipe, a connector with a connection piece is inserted into the pipe, wherein the connection piece has a wall having a thickness which corresponds to a maximum of the thickness of the volume reduction element. Since the heating device has to be guided through the connection piece, there remains between the heating device and the pipe outside the connection piece a relatively large free space which, as set out above, can be reduced by the volume reduction element. When the thickness of the wall of the connection piece is adapted to the thickness of the volume reduction element, that is to say, the "radial extent", it is possible to ensure that a substantially uniform flow resistance is produced in the pipe outside the connection piece and in the connection piece.

In this instance, it is preferable for a spacing between the volume reduction element and the connection piece in the longitudinal direction to correspond to at least the thickness of the volume reduction element. There is consequently sufficient space available to enable the fluid located in the line to move from the annular gap between the volume reduction element and the pipe into the annular gap between the heating device and the connection piece.

The invention is described below with reference to a preferred embodiment together with the drawings, in which:

FIGS. 1a-1d are perspective views of the individual components of a heatable fluid line and the assembly thereof, FIGS. 2a-2d are sectioned views of the illustration according to FIGS. 1a-1d, and FIG. 3 is a highly schematic longitudinal section of a fluid line.

FIG. 1d shows a heatable fluid line 1 having a pipe 2 in which a heating device in the form of a heating rod 3 is arranged. The heating rod 3 is illustrated in FIGS. 1a and 2a as an individual element in each case.

In FIG. 3, it can be seen that the pipe 2 has an inner space 4 in which the heating rod 3 is arranged.

A volume reduction element 5 which is illustrated in FIGS. 1b and 2b as an individual component is constructed as a pipe piece having an inner cross-section 6. The volume reduction element 5 has a cover 7 which in the longitudinal direction has a partition joint 8. The partition joint 8 may, for example, be formed by a cut.

The inner cross-section 6 of the volume reduction element 5 is slightly smaller than an outer cross-section of the heating rod 3.

As can be seen in FIGS. 1c and 2c, the volume reduction element 5 is clip-fitted onto the heating rod 3. To this end, the volume reduction element 5 is bent apart at the partition joint 8 thereof and the heating rod 3 can be inserted through the gap which is produced in the inner cross-section 6. The volume reduction element 5 is, for example, formed from a plastics material which has a degree of inherent tension. When the heating rod 3 is inserted into the inner cross-section 6 of the volume reduction element 5, the volume reduction element 5 is then in abutment with the periphery of the heating rod 3 under a degree of tension. However, since the inner cross-section 6 of the volume reduction element 5 is slightly smaller than the outer cross-section of the heating rod 3, a recess 9 is produced, that is to say, a gap in the covering of the heating rod 3 formed by the volume reduction element 5. This recess 9 extends as far as the heating rod 3.

If the unit which is formed by the heating rod 3 and the volume reduction element 5 is now inserted into the pipe 2 (FIGS. 1d and 2d), there is then produced as a result of the recess 9 a region through which the fluid can flow between the heating rod 3 and the pipe 2. There is consequently produced inside the pipe 2 a free cross-section which in relation to the cross-sectional surface-area thereof has a relatively small wetted surface and consequently a relatively low flow resistance.

Between the volume reduction element 5 and the pipe 2 there remains as before an annular gap 10 which is also filled with the fluid during operation and through which fluid can also flow. However, this annular gap 10 has a relatively large wetted surface so that there is also produced in this instance a correspondingly large flow resistance.

FIG. 3 is a highly schematic cross-section of the fluid line 1. The size relationships illustrated therein are not to scale but instead are illustrated in an exaggerated manner in order to simplify the following explanation. In particular, the size of the annular gap 10 is greatly exaggerated. The recess 9 cannot be seen in this instance since it is located in another plane of section.

It should first be recognized that the volume reduction element 5 has two portions 5, 5' which are separated from each other by an intermediate space 11. This intermediate space 11 is arranged in a curved portion 12 of the fluid line 1. It is illustrated that the portions of the volume reduction element 5, 5' have a relatively large spacing from the curved portion 12. In reality, this spacing will be significantly smaller.

At one end of the pipe, a connection piece 13 of a connector which is not illustrated in greater detail is inserted into the pipe 2. This connection piece 13 has a wall having a thickness d. Since the heating rod 3 also has to be guided through this connection piece, the heating rod 3 must have an outer cross-section which is significantly smaller than the inner cross-section of the connection piece 13 in order to enable a fluid flow.

The volume reduction element 5 has a thickness D which is at least as large as the thickness d of the connection piece 13. That is to say, the thickness d of the connection piece 13 is at a maximum as large as the thickness D of the volume reduction element 5, 5'. It is consequently ensured that a flow of the fluid through the connection piece 13 is not impeded to a greater extent than a flow through the pipe 2 with the internal volume reduction element 5, 5'.

A spacing a between the volume reduction element 5 and the connection piece 13 corresponds to at least the thickness D of the volume reduction element 5. However, it may also be larger.

In order to produce the fluid line 1, the pipe 2 is first left in an extended or linear orientation. The heating rod 3 also has a linear form and is thus initially free from curvatures or the like. Next, the volume reduction element 5 illustrated in FIGS. 1*b* and 2*b* is clip-fitted onto the heating rod 3. This does not have to be carried out at the same time over the entire length of the volume reduction element 5. Instead, the heating rod 3 can be pressed along the separation seam 8 into the inner space 6 of the volume reduction element 5. This is a relatively simple form of production. A heating rod 3 is produced with a volume reduction element 5 clip-fitted thereto, as illustrated in FIGS. 1*c* and 2*c*. In this instance, there is automatically produced the recess 9 whose extent in the peripheral direction corresponds at least to the radial thickness D of the volume reduction element 5.

The heating rod 3 which is provided with the volume reduction element 5 or a plurality of volume reduction elements 5, 5' can then be inserted into the pipe 2, which is readily possible since both the pipe and the heating rod 3 with the volume reduction element(s) 5, 5' have a linear form. Afterwards, the pipe 2 with the heating rod 3 and the volume reduction elements 5, 5' is bent into the desired form so that one or more curved portions 12 are produced. The pipe which has been shaped is then thermo-fixed. As a result of the recess 9, there is produced a relatively low flow resistance for a fluid in the pipe 2. Since the recess 9 extends as far as the heating rod 3, the heating rod 3 can directly heat the fluid located in the pipe without a heat flux being necessary through the volume reduction element 5. This is naturally nonetheless present and also heats a fluid in the annular gap 10.

The invention claimed is:

1. A heatable fluid line comprising:
a pipe which has an inner space;
a heating device which is constructed as a heating rod and is arranged in the inner space to delineate an annular gap between the pipe and heating device; and
a volume reduction element arranged in the annular gap so that an annular portion of the annular gap remains between the volume reduction element and the pipe for a heatable fluid to flow through the pipe between the volume reduction element and the pipe,
wherein the volume reduction element is constructed as a pipe piece having a cover with a cut in a longitudinal direction and a recess, which is formed by the cut in the cover of the volume reduction element in the annular gap, extends along the heating device,
wherein the recess produces a region configured for the heatable fluid to flow through between the heating rod and the pipe, and
wherein the volume reduction element is clip-fitted onto the heating rod.

2. The fluid line as claimed in claim 1, wherein the recess extends as far as the heating device.

3. The fluid line as claimed in claim 2, wherein the recess has in the peripheral direction of the heating device an extent which corresponds at least to a radial thickness of the volume reduction element.

4. The fluid line as claimed in claim 1, wherein the volume reduction element is at least partially formed by a hollow member which is separated in the longitudinal direction.

5. The fluid line as claimed in claim 4, wherein the hollow member has an inner cross-section which is smaller than an outer cross-section of the heating rod.

6. The fluid line as claimed in claim 1, wherein the volume reduction element is arranged with at least two portions on the heating device.

7. The fluid line as claimed in claim 6, wherein the at least two portions leave an intermediate space free between them.

8. The fluid line as claimed in claim 7, wherein the intermediate space is arranged in a curved portion of the fluid line.

9. The fluid line as claimed in claim 1, wherein the fluid line is thermo-fixed with the heating device and the volume reduction element.

10. The fluid line as claimed in claim 1, wherein, at least at one end of the pipe, a connector with a connection piece is inserted into the pipe, wherein the connection piece has a wall having a thickness which corresponds to a maximum of the thickness of the volume reduction element.

11. The fluid line as claimed in claim 10, wherein a spacing between the volume reduction element and the connection piece in the longitudinal direction corresponds to at least the thickness of the volume reduction element.

12. A heatable fluid line comprising:
a pipe which has an inner space;
a heating device which is constructed as a heating rod and is arranged in the inner space to delineate an annular gap between the pipe and heating device; and
a volume reduction element, which is arranged in the annular gap, includes a longitudinal cut, so that facing sides of the longitudinal cut are separatable to clip-fit the volume reduction element onto the heating device,
wherein, when the volume reduction element clip-fitted onto the heating device is arranged in the annular gap, a recess, formed between the facing sides of the volume reduction element, extends along a length of the volume reduction element for guiding a heatable fluid flow between the heating device and the pipe.

13. The heatable fluid line according to claim 12, wherein, when the volume reduction element clip-fitted onto the heating device is arranged in the annular gap, an annular portion, configured for guiding the heatable fluid flow between the volume reduction element and the pipe, remains open between the volume reduction element and the pipe.

* * * * *